Feb. 10, 1970 TAKAO SHIBATA 3,494,270
STEREOSCOPIC PHOTOGRAPHING PROCESS
Filed April 14, 1965 10 Sheets-Sheet 2
Fig. 6.
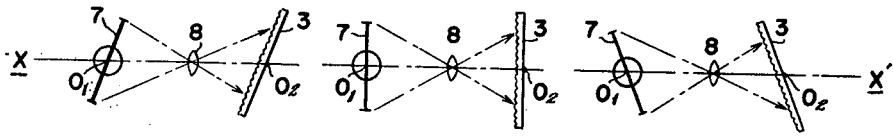
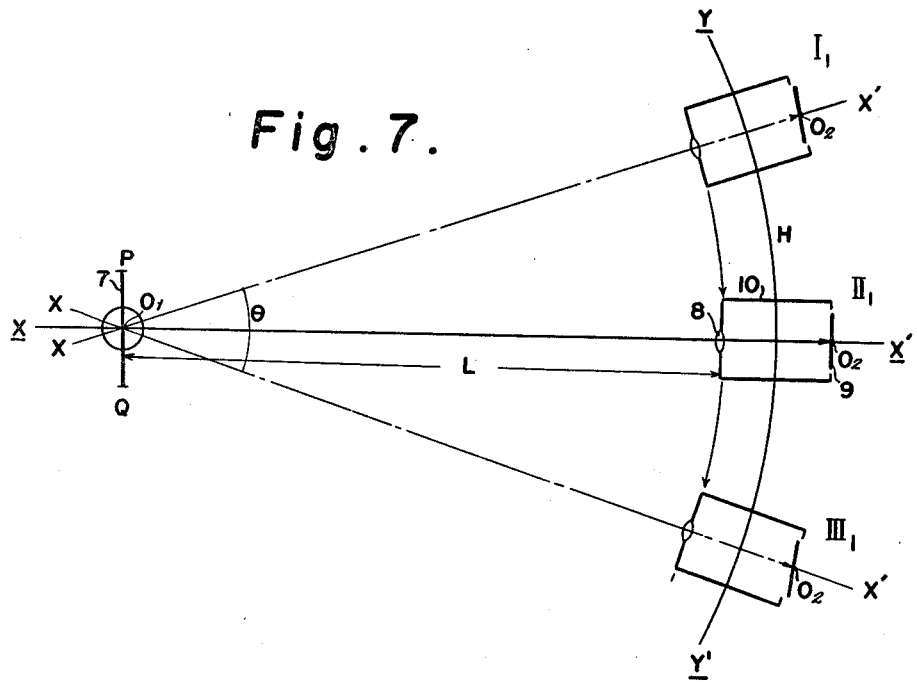
Fig. 7.
Takao Shibata,
INVENTOR
BY Wenderoth,
Lind & Ponack, attys INVENTOR
Takao Shibata,
BY Wenderoth,
Lind & Ponack, attys Feb. 10, 1970 TAKAO SHIBATA 3,494,270
STEREOSCOPIC PHOTOGRAPHING PROCESS
Filed April 14, 1965 10 Sheets-Sheet 7

Takao Shibata
INVENTOR

BY Wenderoth,
Lind & Ponack, attys

Feb. 10, 1970 TAKAO SHIBATA 3,494,270
STEREOSCOPIC PHOTOGRAPHING PROCESS
Filed April 14, 1965 10 Sheets-Sheet 8

Takao Shibata,
INVENTOR
BY Wenderoth,
Lind & Ponack, Attys

Feb. 10, 1970 TAKAO SHIBATA 3,494,270
STEREOSCOPIC PHOTOGRAPHING PROCESS
Filed April 14, 1965 10 Sheets-Sheet 10

Takao Shibata
INVENTOR
BY Wenderoth,
Lind & Ponack, attys

United States Patent Office 3,494,270
Patented Feb. 10, 1970

3,494,270
STEREOSCOPIC PHOTOGRAPHING PROCESS
Takao Shibata, 665, 5-chome, Itabashi-cho, Itabashi-ku, Tokyo, Japan,
Filed Apr. 14, 1965, Ser. No. 448,163
Claims priority, application Japan, Apr. 18, 1964, 39/21,728; June 10, 1964, 39/32,643, 39/32,644; June 15, 1964, 39/33,486; June 17, 1964, 39/33,996
Int. Cl. G08b *35/08*
U.S. Cl. 95—18                2 Claims

ABSTRACT OF THE DISCLOSURE

A process of making a stereoscopic photograph. A camera is moved along a straight linear track for a scanning distance in a direction perpendicular to a reference line between the center of the track and the center of the object and in a direction generally parallel to the object. The track is at a photographing distance from the object. A screen is provided at the focal plane of the camera for making a line image from images projected on the screen from different angles relative to the screen. A sheet of photosensitive material is provided on the back of the screen. At each of a series of positions of said camera along said track with the optical axis of said camera parallel to said reference line, an image of said object is refracted through said lens onto said screen through a rotating prism, and the photo-sensitive material is exposed at each of said positions.

---

This invention relates to a stereoscopic photographing process utilizing a lenticular screen or a line screen having a similar optical action and has particular reference to apparatus to carry the process into practice.

Certain processes have been already known for effecting a stereoscopic photographing utilizing a lenticular screen (or line screen). One such process may be termed an indoor shooting in which an object to be photographed is mounted on a turntable and rotated therewith so that all sides of the object desired for stereoscopic representation may be photographed by a stationary camera. Another such process may be termed an outdoor shooting in which the object is fixed in place and photographed by a camera which rotates about the center of the object in an arcuate fashion.

However, the above photographing processes present a limitation on the size of an object to be mounted on the turntable and cannot handle large or immovable objects. To permit the photographing of such large-scale objects as for example automobiles, ships, aircrafts, buildings, landscapes and the like, it will be necessary to provide arrangements for making the camera turn arcuately about the center of the object.

Such outdoor shooting method, though this has no critical restriction upon the character or shape of an object to be photographed, has the disadvantage that the effective photographing distance of the camera varies with the size and configuration of the object and hence, the curvature of camera movement changes. This makes it difficult for the camera to scan all desired phases of different objects along a track having a fixed curvature.

Whereas, it is an object of the present invention to provide improved methods and means of achieving a stereoscopic photographing of various sizes of images by the scanning of a camera along one and the same track of movement.

It is another object of the invention to provide an improved method of making stereoscopic photographs in which the camera makes a parallel movement with respect to an object to be photographed and any deviation of the center of the object from the focal plane of the camera is corrected in synchronism with the parallel movement of the camera.

It is a further object of the invention to provide an improved method of making stereoscopic photographs in which any appreciable shift of the center of the image with respect to the focal plane of the camera is corrected by rendering the camera unit rotatable as a whole or the lens part of the camera, or by causing the lens and the focal plane to move alternately.

It is a still further object of the invention to provide an improved method of making stereoscopic photographs in which any appreciable shift of the center of the image with respect to the focal plane of the camera is corrected optically by the movement of a reflecting mirror mounted in the camera lens or by rendering the prism movable.

These and other objects together with the features of the invention will become more apparent from the following detailed description taken in connection with the accompanying drawings, wherein like numerals refer to like parts throughout and in which:

FIG. 1 is a plan view of a lenticular screen;
FIG. 2 is a transverse cross-section in part of the lenticular screen;
FIG. 3 is a plan view of a line screen;
FIG. 4 is a transverse cross-section in part of the line screen;
FIG. 5 is a transverse cross-section of the lenticular screen utilized to explain the optical action thereof;
FIG. 6 is a plan view of a focal plane mounted with a lenticular screen in relation to an image to be photographed;
FIG. 7 schematically illustrates a conventional process for stereoscopic photographing in which the camera moves arcuately about the center of the image;
FIG. 8 schematically illustrates the manner in which the camera is moved in one direction parallel to the image;
FIGS. 9–17 inclusive schematically illustrate different modes of stereoscopic photographing embodying the invention, of which FIG. 9 schematically illustrates the manner in which the camera is moved parallel with and rotated toward the center of the image; FIG. 10 schematically illustrates the manner in which the front part of the camera is moved toward the center of the image in synchronism with the parallel movement of the camera; FIG. 11 schematically illustrates the manner in which the lens part of the camera is moved in synchronism with the parallel movement of the camera; FIG. 12 schematically illustrates the manner in which the focal plane of the camera is moved in synchronism with the parallel movement of the camera;
FIG. 13 schematically illustrates the manner in which both the lens part and the focal plane of the camera are moved simultaneously in synchronism with the parallel movement of the camera;
FIG. 14 schematically illustrates the manner in which the reflecting mirror at the front of the camera is moved in synchronism with the parallel movement of the camera;
FIG. 15 is a schematic illustration utilized to explain the function of FIG. 14;
FIG. 16 schematically illustrates a modification of the manner in which the reflecting mirror is moved in synchronism with the parallel movement of the camera; and
FIG. 17 schematically illustrates the manner in which the prism arranged in front of the camera is moved in synchronism with the parallel movement of the camera;
FIG. 18 is a schematic illustration utilized to explain the angle of deviation of the prism;
FIG. 19 is a perspective view of a camera equipment arrangement employed to carry the process of FIG. 9 into practice;

Figure 1:
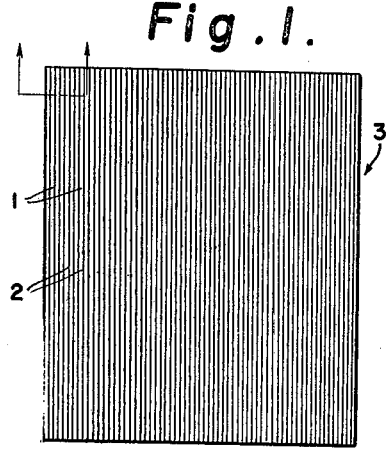
Figure 2:
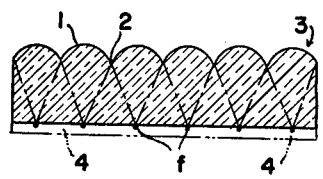

The lenticular screen shown in FIGS. 1 and 2 is an image reception screen made up from a plurality of adjoining cylindrical lenses 1 aligned parallel to the corresponding generating lines 2 and formed on a transparent base made of a glass, hard and soft synthetic resins or the like. The lenticular screen 3 is characterized in that light on incidence to the front face of the cylindrical lenses 1 forms linear focuses $f'$ at the reverse face thereof which are parallel to the generating lines 2 different from the ordinary camera performance. (See FIG. 2.)

The lenticular screen 3 has attached to the reverse face thereof with a sensitized plate 4 and is mounted on the focal plane of the camera. With this construction, the image when photographed appears on the sensitized plate 4 as a number of converged lines parallel to the generating lines. 2. The image thus printed on the sensitized plate 4 does not present successive graduations which characterizes a stereoscopic photograph, when directly viewed as it is. However, when the sensitized plate carrying the image is now attached to the reverse face of the lenticular screen 3 in the same manner as it was photographed, the image may be seen from the side of the cylindrical lens 1 as having a successively graduated representation which perfectly copies the original object. It should, however, be noted that this true replica of the image cannot always be reproduced from any angles of view but must be viewed at a position corresponding to the relative positions of the camera and the object photographed; otherwise, the image goes out of focus and becomes blurred.

The image linearly printed will be hereinafter referred to as an "elemental image" while the image observed through the lenticular screen 3 as a "composite image."

Figure 3:
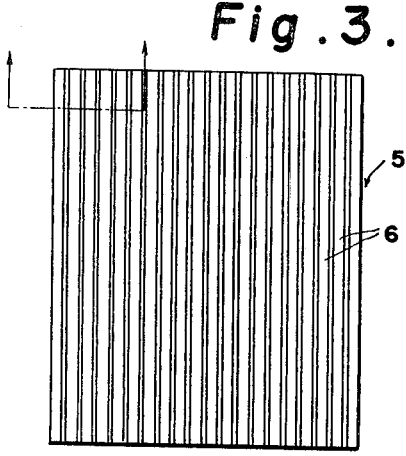
Figure 4:
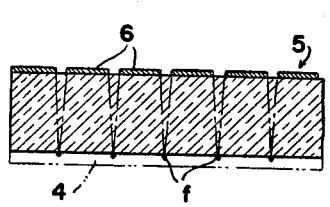

The elemental image may be obtained also with use of a line screen (see FIGS. 3 and 4) which has an optical action similar to the lenticular screen 3 already described. Different structurally from the lenticular screen 3, the line screen comprises a number of opaque lines 6 arranged in parallel and spaced apart by transparent zones instead of the cylindrical lenses. At the transparent zones separating the adjoining lines 6, there may be obtained linear focuses $f'$ in a manner similar to the lenticular screen 3. Therefore, the following description taken in connection with the lenticular screen 3 may equally apply to the line screen.

As already described, the lenticular screen 3 presents a number of converged linear focal points $f'$ as provided by a plurality of cylindrical lenses 1. This means that one cylindrical lens is provided thereunder with sufficient space for retaining a plurality of linear focal points.

Figure 5:
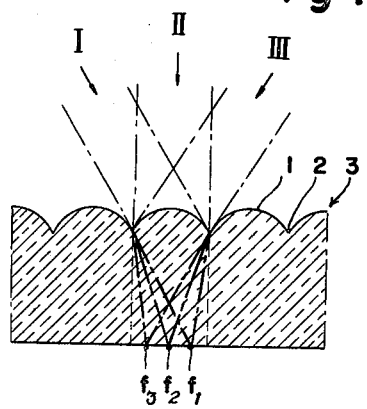
Figure 8:
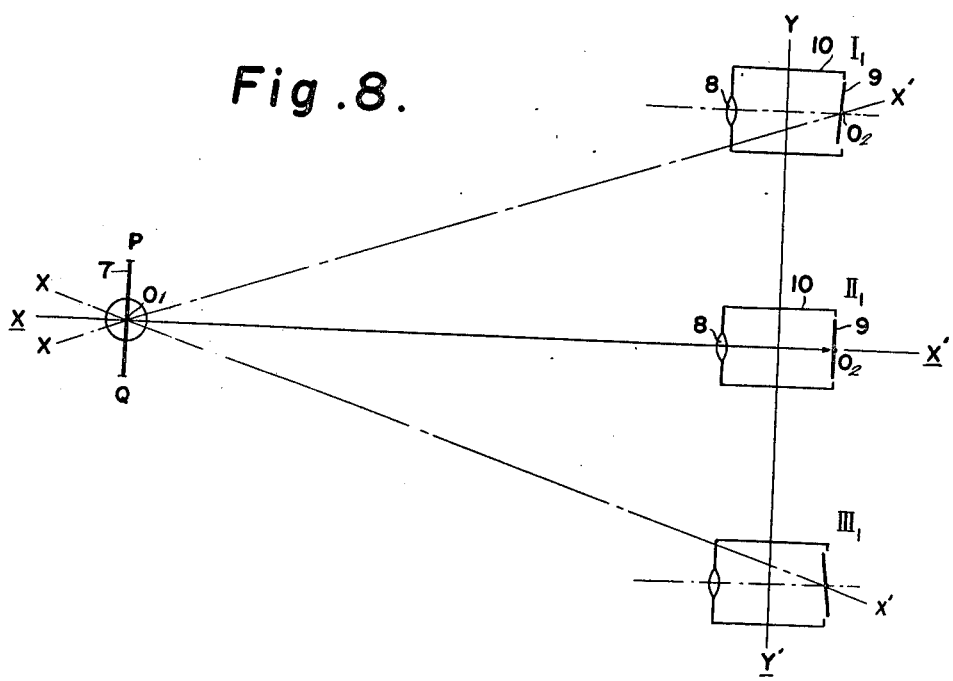

FIG. 5 shows the case where a plurality of images are printed in a linear pattern under each cylindrical lens. The light coming from the directions designated at I, II and III may be printed under each cylindrical lens 1 as three linear focal points $f_1$–$f_3$ and may be viewed in a certain magnification on the entire face of the lenticular screen 3 provided that image is observed in the direction in which it was photographed.

However, if the linear focal points $f_1$–$f_3$ were created with only small angular deviations from each other and should come within the range wherein they are seen integrally, these focal points would appear as superimposed to prohibit the observation of individual features of the image represented by each focal point.

A stereoscopic protograph may thus be obtained, utilizing the advantage of a lenticular screen, by changing successively the position of each side of the object within the range of radius in which all elemental areas of the image appear as superimposed but can exhibit a stereoscopic effect when each elemental image formed by linear focal points $f_1$–$f_3$ is inversely viewed through the lenticular screen.

It will therefore be necessary to follow a certain sequence of taking a stereoscopic picture; that is, the angle of the lenticular screen 3 should be changed synchronously with changing plane of the object thereby developing elemental images or linear focal points $f_1$–$f_3$ different in focal position under each cylindrical lens 1.

Part figures $I_1$, $II_1$ and $III_1$ of FIG. 6 respectively show the sequence of photographing and also represent the relative positions of the object 7 and the lenticular screen 3. Designated at 8 is a lens with its associated camera omitted. At the posture $I_1$ of the lenticular screen, the object 7 is photographed obliquely along a first face thereof which forms part of a stereoscopic photograph, the scanning of the camera continuing thus along a second face $II_1$ and a third face $III_2$ progressively until all phases of the object desired to be covered are photographed. At which time, it will be obvious that the angle of the lenticular screen 3 with respect to the object 7 varies in synchronism with the parallel movement of the camera assembly. Here, it is to be noted that the center $O_1$ of the object 7 is connected with the center $O_2$ of the lenticular screen 3 on the optical axis X–X', while the lens 8 of the camera normally positioned on the optical axis should not deviate from the optical axis X–X' when scanning the object 7. If the lens 8 deviates from the optical axis X–X', the image of the object 7 tends to shift in position from one elemental image to another due to unstable focal movement, the focal points being superimposed or irregularly distributed so that the resulting photograph is blurred.

To eliminate the above difficulty, it is required that the center $O_2$ of the camera lens 8 and that of the lenticular screen 3 are secured in proper position with respect to the optical axis X–X'.

The process illustrated in FIG. 7 is well known in which the camera 10 successively scans the object 7 in an arcuate locus defined by the angle $\theta$ with respect to the center $O_1$ of the object 7. In this operation, the arcuate movement of the camera 10 takes place centering around the center $O_1$ of the object so that the focal plane 9 mounted with the lens 8 and the lenticular screen 3 has its center $O_2$ always on the optical axis X–X'.

However, the above prior-art method of taking a stereoscopic photograph has the disadvantage that the camera to object distance L must be determined by the size of the object 7 which further governs the radius R of movement of the camera. It would therefore be difficult to photograph objects of different sizes with the camera designed to move along a track having a fixed radius. In other words, it is necessary to select a track of camera movement depending upon the distance L. Furthermore, it will be necessary to change the distance of travel H of the camera in accordance with the breadth P–Q of the object 7.

The above conventional process would be handicapped particularly in an attempt to photograph large outdoor objects such as a landscape, because the photographing distance L increases considerably and the distance of arcuate movement H of the camera 10 increases in proportion therewith.

In order to eliminate the foregoing difficulties, it becomes necessary to make the track of the camera 10 shift vertically with respect to the optical axis X–X' (in this instance, however, the camera movement with respect to the object is horizontal and parellel). However, this will cause the lens 8 of the camera to deviate from the optical axis X–X' connecting the center $O_1$ of the object 7 with the center $O_2$ of the focal plane 9 which has moved together with the camera 10.

The present inventors have discovered a number of useful methods in which the camera lens is moved in synchronism with the camera assembly 10 while in vertical movement thereby keeping the camera lens oriented toward the center $O_1$ of the object 7 and situated on the optical axis X–X'.

One of these methods may be basically understood from the formula:

$$\tan \theta = H/L$$

This may be applied so that the camera rotates in synchronism with its vertical movement, as this will be more fully described with reference to FIG. 9.

The object 7 having a width P–Q may be placed in a position relative to the camera assembly 10 comprising a lens 8 and a lenticular screen 3 on a focal plate 9, the lens 8 being positioned on the optical axis X–X' connecting the center $O_1$ of the object 7 with the center $O_2$ of the lenticular screen. The photographing distance L may be determined with reference to the optical axis X–X' depending upon the size or width P–Q of the object. The track Y–Y' along which the camera makes horizontal movement with respect to the object should be set vertical to the optical axis X–X'. The camera assembly 10 moves along the track Y–Y' for a distance H determined by the distance L between the center $O_1$ of the object to the line Y–Y' and by the extent to which a stereoscopic effect is desired to achieve. This distance or amount of movement H may be calculated on the basis of the optical axis X–X' and hence the actual operating value would be 2H.

The rotation of the camera equipment 10 takes its fulcrum on the line Y–Y' and its angle of rotation $\theta$ may be defined by the distance L and the amount of movement H, thus:

$$\tan \theta = H/L$$

It will be appreciated that the rotary angle $\theta$ synchronizes with the movement of the camera 10.

Now, in operation of the camera equipment 10, it may be arranged with its reference point registered on the optical axis X–X' and moved first to the position $I_1$ and continued to move the distance of 2H to the position $III_1$. In any instant position of the camera during movement around the object 7, the camera lens retains its predetermined angular posture with its focal plane 9 agreeing in center with the object 7 upon the optical axis X–X'. This will be obvious from the camera to object relation defined by the above formula.

As the camera 10 moves along the track Y–Y' vertical to the optical axis X–X', the distance L changes which in turn introduces a change in the size of the image on the focal plane and in the elongation of the bellows, resuling in "flapping." This flapping of the image, if any, would be negligible because the value $f$ and H are sufficiently small compared to the distance L.

In the first example of stereoscopic photographing embodying the invention just described, the camera makes successive linear and rotary movements along the track Y–Y' disposed vertically to the optical axis X–X' with the lenticular screen registering in center with the object; therefore, there will be no shift in the focal point of the image.

The typical requirements for taking a stereoscopic photograph in accordance with the invention are exemplified below.

L=200 cm.
2H max.=70 cm.
Photographing lens $f$=60 cm.
Cylindrical lens on lenticular screen $r$=0.75 mm., P=0.40 mm.

In a second embodiment of the invention, the camera is caused to move in a direction vertical to the optical axis X–X' and at the same time, the lens makes a horizontal arcuate movement toward the center of the object. In other words, the lens is directed with its focal plane toward the center of the object in synchronism with the camera movement.

The object 7 having a width P–Q may be placed in a position relative to the camera assembly 10 comprising a lens 8 and a lenticular screen 3 on a focal plate 9, the lens 8 being positioned on the optical axis X–X' connecting the center $O_1$ of the object 7 with the center $O_2$ of the lenticular screen. The photographing distance L may be determined with reference to the optical axis X–X' depending upon the size or width P–Q of the object. The track Y–Y' along which the camera makes horizontal movement with respect to the object should be set vertical to the optical axis X–X'. The camera assembly 10 moves along the track Y–Y' for a distance H determined by the distance L between the center $O_1$ of the object to the line Y–Y' and by the extent to which a stereoscopic effect is desired to achieve. This distance or amount of movement H may be calchlated on the basis of the optical axis X–X' and hence the actual operating value would be 2H.

Now, in operation of the comera equipment 10, it may be arranged with its reference point registered on the optical axis X–X' and moved first to the position $I_1$ and continued to move the distance of 2H to the position $III_1$. In any instant position of the camera during movement around the object 7, the camera lens retains its predetermined angular posture with its focal plane 9 agreeing in center with the object 7 upon the optical axis X–X'.

This is because the camera lens 8 follows up along a new optical axis $x–x'$ which connects the center $O_2$ of the focal plane 9, that has deviated from the optical axis X–X' due to the movement of the camera assembly, with the center $O_1$ of the object 7. The optical axis $x–x'$ is defined by the angle $\theta$ which maintains the relation of $\tan \theta = H/L$ with respect to the optical axis X–X', so that the lens 8 of the camera assembly 10 is oriented toward the center $\theta$ of the object 7 even with changes in the distance L and the amount of movement H and the center $O_1$ of the object 7 is focused through the lens 8 to the center of the focal plane 9.

The second embodiment of the invention just described will also overcome the difficulties hitherto encountered with the conventional art of stereoscopic photographing as stated at the outset, because the camera is so designed as to make a successive movement along the track Y–Y' vertical to the optical axis X–X'. Furthermore, the lens is synchronized with the camera in scanning the object in an arcuate fashion horizontal to the center of the object thereby eliminating the drawback inherent in the vertical movement of the camera.

In a third to a fifth embodiment, inclusive, of the invention, the camera is moved along the track $y–y'$ vertical to the optical axis X–X' with the center $O_1$ of the object 7 connected with the center $O_2$ of the lens 8 or focal plane 9 on the optical axis X–X', in which instance the amount of movement of the lens is $h$ relative to the vertical movement H of the camera assembly, the value $h$ being represented by the formula:

$$h = (b/L)H$$

Figure 11:
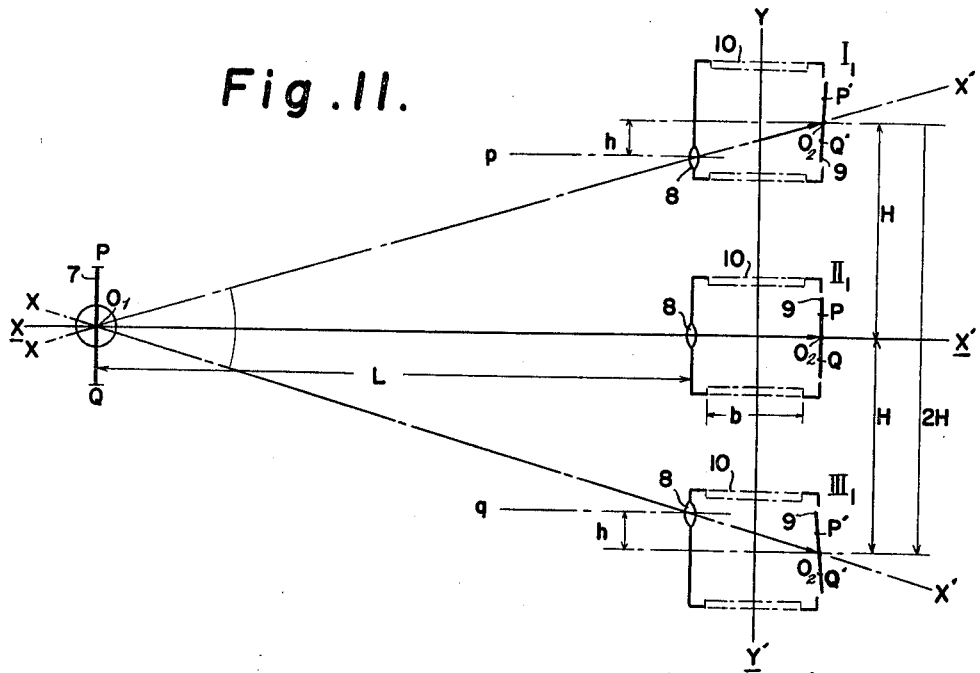

This will be more fully described in reference to FIG. 11, wherein the symbol L denotes the distance between the center $O_1$ of the object 7 and the lens 8; $f$ denotes the focal distance of the lens 8 and $b$ denotes the elongation of the bellows of the camera. Thus, there may be established the formula $1/L + 1/b = 1/f$, from which the equation of the value $h$ of the lens 8 may be derived as follows:

$$H/L = h/b$$
$$h = (b/L)H$$

In this case, the amount of movement $h$ of the lens 8 is unidirectional with respect to the optical axis X–X′; hence, this value $h$ will be twice as great when the camera has completed an arcuate movement around the object. This is because the total movements of the camera 10 would be $2(H+h)$ if the camera 10 is moved vertically simultaneously as it is moved arcuately for the amount of rotation $\theta$ around the center $O_1$ of the object 7.

The vertical movement H of the camera changes with changing distance L and extent of stereoscopic effect. However, the camera may be moved vertically for the distance 2H across the optical axis X–X′, within which range it is possible to photograph every phase of a given object to complete a stereoscopic representation.

As long as the definition of $h=(b/L)H$ is satisfied, the image of the center $O_1$ of the object 7 will invariably focus upon the center $O_2$ of the focal plane 9 of the lens. Similar results may be obtained if the value $h$ is given to the focal plane 9. Alternatively, lens 8 and the focal plane 9 may be shifted alternately.

Reference to FIG. 11 shows the third embodiment of the invention in which the camera 10 moves the distance 2H along the line Y–Y′ vertical to the optical axis X–X′ as far as the point P–q and the camera lens 8 accordingly moves the distance $2h$ scanning the object 7 from point P′ to point Q′. The center $O_2$ of the lens 8 or the focal plane 9 agrees on the optical axis x–x′ during the movement of the camera for the distance p–q, so that there will be no shift of focus for the vertical movement of the camera 10. It is thus possible to obtain elemental images of the object 7 as illustrated by linear focal points $f_1$–$f_3$ in FIG. 5.

Figure 12:
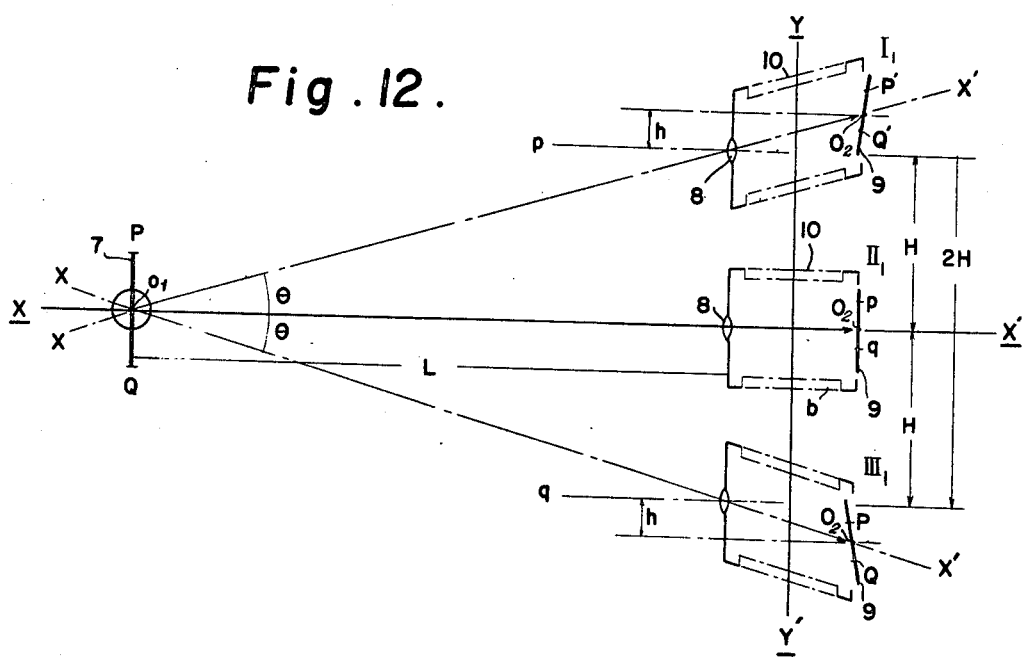

Reference to FIG. 12 shows the fourth embodiment of the invention in which different from the arrangement revealed in the third embodiment of the invention, the camera lens 8 is held stationary with the camera assembly 10 and arranged to move therewith in a direction vertical to the optical axis, while the focal plane 9 is caused to move the distance $h$. With this camera arrangement, there may be obtained similar results to the third example.

Figure 13:
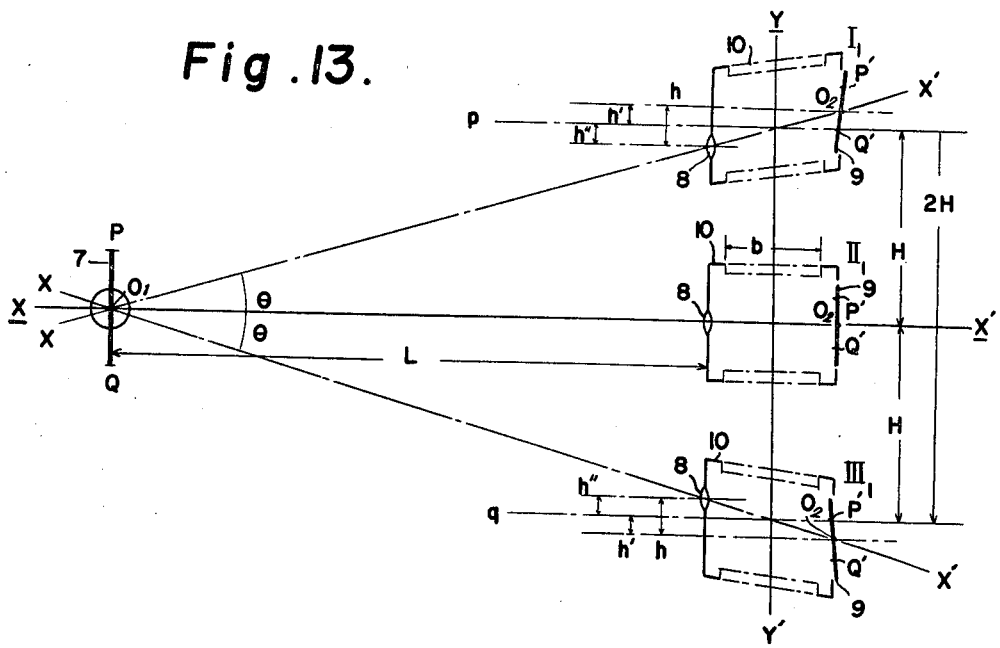

Reference to FIG. 13 shows the fifth embodiment of the invention in which the focal plane 9 and the lens 8 are alternately moved for the distance $h'$, $h''$, the total amount of movement $h$ being equal to $h'$ plus $h''$. There may be obtained similar results to the third example given above.

By virtue of the inventive concept of the invention represented by the formula $h=(b/L)H$ whereby the camera 10 is moved vertical to the optical axis x–x′, it is possible to retain the desired accuracy of equipment performance as the camera makes linear movement and it is further possible to use the same camera equipment on the same track of movement even when the distance L is changed. It will be obvious that according to the invention, satisfactory stereoscopic photographs may be taken of any large and complicated outdoor objects by simply selecting the photographing distance.

A typical example of operating requirements to carry the invention into practice is illustrated below.

Photographing distance L=20 m.
Lens focal distance $f$=60 cm.
Elongation of bellows $b$=61.8 cm.
Total vertical movement of camera 2H=70 cm.
Lens movement $h$=1.08 cm. and its total $2h$=2.16 cm. as derived from the basic formula $h=(b/L)H$ In the sixth embodiment of the invention, the deviation of the center of the object arising from the linear movement of the camera is corrected by a reflecting mirror which orients in synchronism with the camera movement so that the center of the object 7 agrees with the center of the focal plane 9.

Figure 14:
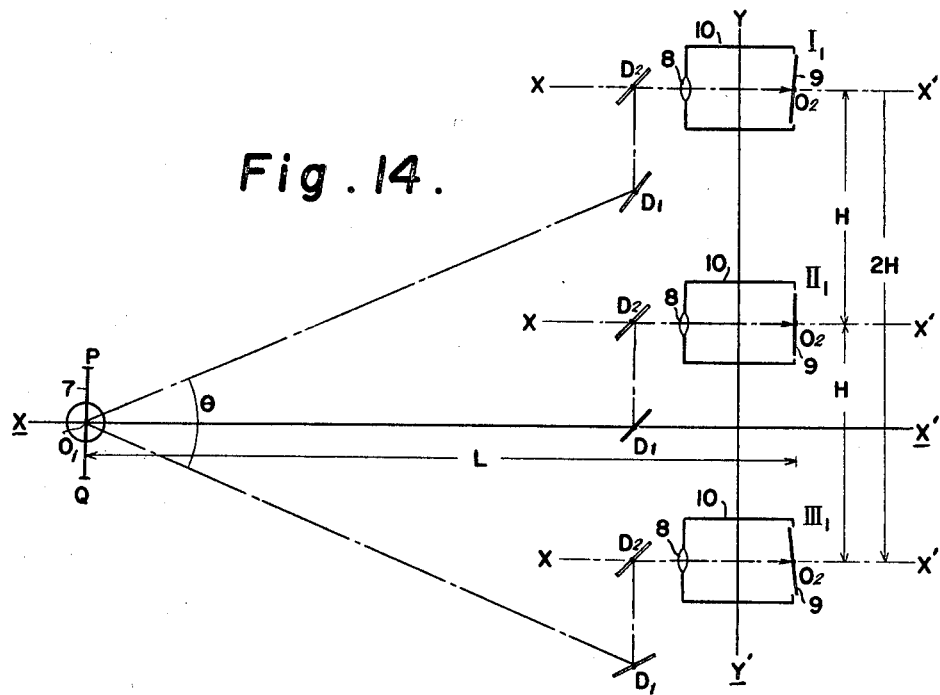
Figure 15:
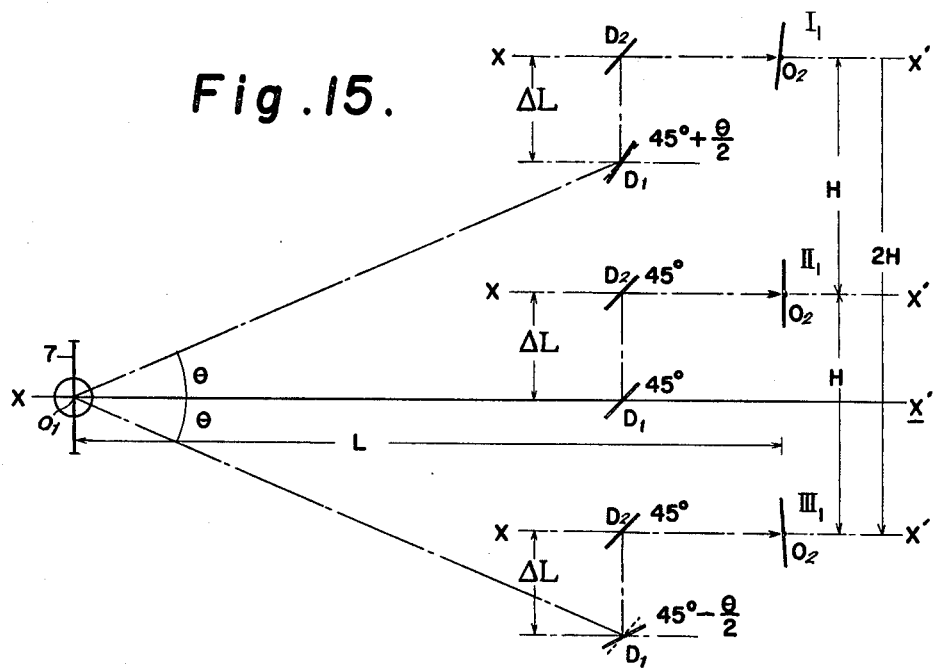

Reference to FIG. 14 shows the object 7 having a width P–Q, to the center of which is set the optical axis X–X′. Designated at 10 is $h$ the camera having a lenticular screen 3 mounted on its focal plane 9 which moves along the track Y–Y′ vertical to the optical axis X–X′ and in a direction parallel with the object 7. Designated at $D_1$ and $D_2$ are a pair of reflecting mirrors mounted before the lens 8 of the camera assembly 10. These mirrors are oppositely positioned at an angle of 45° with respect to the axis of the camera 10 which is parallel with the optical axis X–X′, and move with the camera 10. The mirror $D_1$ orients in response to the movement of the camera 10. Designated at L is the distance between the center $O_1$ of the object 7 and the focal plane 9 of the camera 10. Designated at H is the amount of unidirectional movement of the camera and at 2H is the total distance of movement of the camera.

The camera 10 is positioned with its axis x–x′ aligned parallel with the optical axis X–X′ and with the reflecting mirror $D_1$ set with its center on the optical axis X–X′ and with the center $O_1$ of the object 7 registered with the center $O_2$ of the focal plane 9 across the pair of reflecting mirrors $D_1$ and $D_2$. This is considered as a reference point for taking a photograph whereby determining the distance of unidirectional movement of the camera from its axis to the object depending upon the physical properties of the object 7 and the distance at which a stereoscopic photograph is to be taken. In this manner, the total distance of movement of the camera 10 from the first point of direction $I_1$ to a second point of direction $III_1$. Depending upon this distance of movement 2H, the camera 10 may be shifted to the position $I_1$ where it is set for photographing the object and thereafter, the camera is continuously or intermittently moved along the track Y–Y′ as far as to the position $III_1$, thus completing the scanning of the desired phases of the object. In order to bring the center of the object 7 into line with the center of the focal plane C at the distance between point $I_1$ and point $III_1$, one of the pair of mirrors designated at $D_1$ is oriented for an angle $\alpha$ while the other mirror $D_2$ is fixed at 45°. The angle of orientation $\alpha$ depends upon the angle of vision $\theta$ and is $+\alpha$ from the point $I_1$ to the optical axis X–X′ and $-\alpha$ from the optical axis X–X′ to the point $III_1$. Thus, the optical axis X–X′ serves as zero point from which the value $\alpha$ increases in plus or minus more the greater the angle of vision $\theta$.

The angle of orientation of the mirror $D_1$ is determined by the distance L and the value H corresponding to the spacing between the camera axis x–x′ and the reflecting mirror $D_1$ or the spacing between the pair of mirrors $D_1$ and $D_2$. This may be expressed by the formula:

$$\tan \theta = H/(L+\Delta L)$$
$$\alpha = \theta/2$$
$$\alpha = \theta/2 = \tfrac{1}{2} \tan^{-1} \frac{H}{L+L}$$

It will be understood that the mirror $D_1$ is positioned 45° apart from the mirror $D_2$ on the optical axis X–X′; the value at point $I_1$ being 45°$+\alpha$ and at point $III_1$ being 45° $-\alpha$. Thus, the reflecting mirror $D_1$ may be oriented from point $III_1$ in a manner to satisfy the above equation so that the camera moves along the horizontal line of track Y–Y′ in a direction vertical to the optical axis X–X′ and parallel to the object. Similar results may be obtained with a single piece of mirror instead of a pair of mirrors, as this will be more fully described in reference to FIG. 16.

Figure 16:
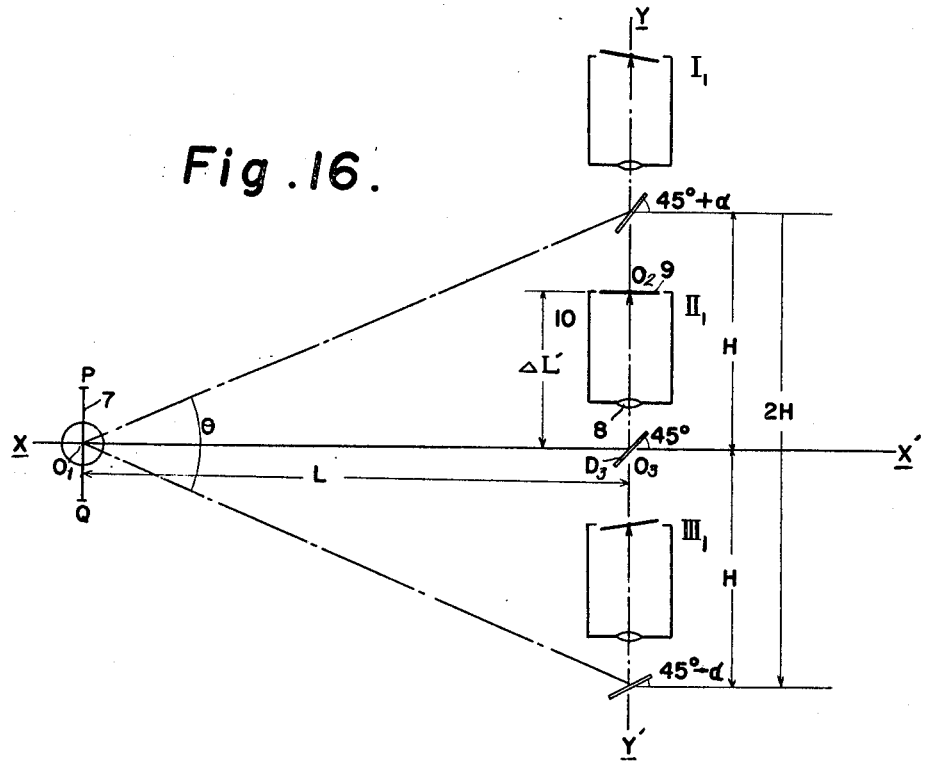

In FIG. 16, the camera 10 is arranged with this axis x–x′ superimposed upon the track Y–Y′ vertical to the optical axis X–X′ and with a single piece of mirror $D_3$ mounted before the lens 8 at an angle of 45° to the camera axis x–x′ and to the optical axis X–X′. The mirror $D_3$ is oriented in synchronism with the camera movement, the distance of this orientation being conveniently represented by the value L. This value may be set at L′ which represents the distance between the center $O_1$ of the object 7 and the center $O_3$ of the reflecting mirror $D_3$, and hence, the value $D_3$—9 will be $\Delta$ L′, thus:

$$L = \Delta L' + L'$$

From which the value H and the value 2H may be easily obtained. It is thus possible to keep the object 7 in center with the focal plane 9 simply by orienting the reflecting mirror $D_3$ in synchronism of the movement of the camera 10. It is thus possible according to the invention to obtain a stereoscopic photograph which is as appealing as obtained by any conventional arcuate shooting methods, and yet is accomplished by the same camera equipment regardless of the size and character of an object to be photographed or the distance between the camera and the object.

In the seventh embodiment of the invention, shifts of the image which will arise from the linear movement of the camera scanning the object are eliminated by the prism which moves with the camera and displaces in synchronism therewith from the start to the final point of scanning. Thus, the object corresponds in center to the focal plane within the range of linear movement of the camera.

Figure 17:
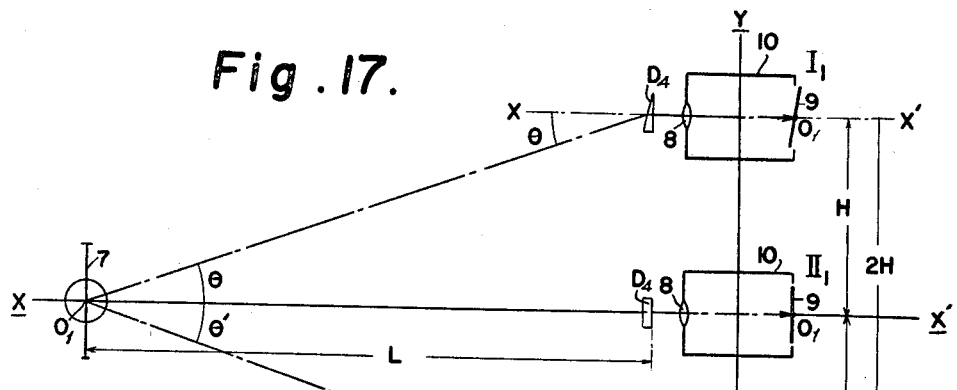
Figure 18:
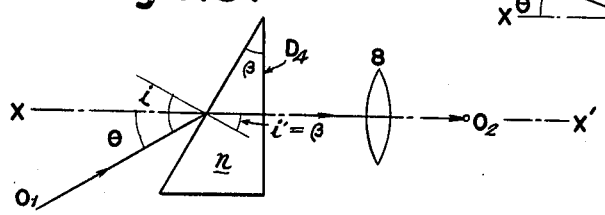

Reference to FIG. 17 shows the above photographing arrangement embodying the invention, wherein the reference numeral 7 denotes an object, and designated at 10 is the camera unit having rotatably mounted thereon a lenticular lens 3 which serves as a focal plane 9. Designated at 8 is the camera lens and at $D_4$ is the prism mounted in front of the lens 8 which moves with the camera and displaces in response with such camera movement. Designated at X–X′ is the optical axis which serves as a reference line for a stereoscopic photographing, while at Y–Y′ is linear track aligned vertical to the optical axis X–X′ and extending a distance L from the center $O_1$ of the object 10 to the prism $D_4$ and in parallel with the object.

Further designated at H in the same figure is the amount of unidirectional movement of the camera 10 and at 2H is the total amount of camera movement required to fully scan the desired successive portions of the image. The symbol x–x′ represents the axis of the camera equipment 10 which is indicative of the beginning and end of the photographing.

The camera 10 may be arranged to follow the linear track Y–Y′ with its focal plane center $O_2$, lens 8 and prism $D_4$ all registered upon the optical axis X–X′. The photographing distance L may be determined by the shape and scale of the object 7 to be photographed, thus measuring the amount of unidirectional movement H of the camera 10. The total amount of camera movement 2H required may be easily calculated from the value H thereby setting the initial point $I_1$ and the terminal point $III_1$ of the camera movement according to its axis x–x′.

With the camera 10 positioned on the optical axis X–X′, the center $O_1$ of the object 7 is focused upon the center $O_2$ of the focal plane 9 through the prism $D_4$ and the lens 8, the prism $D_4$ being retained in its parallel and plane position. This position of the prism, $D_4$ is considered as the zero point where to start the camera movement. The camera 10 is then moved along the linear track Y–Y′ from the optical axis X–X′ to the initial position $I_1$. During this camera movement, the portion of the object 7 is photographed which comes within the angle of vision $\theta$ which is caused by the prism $D_4$ to refract and superimpose upon the camera axis x–x′ thereby capturing the image of the object 7 corresponding in center with the focal plane 9. The camera 10 continues to move successively or intermittently along the linear track Y–Y′ for the distance 2H from the initial position $I_1$ over the optical axis X–X′.

The terminal position $III_1$ of the camera 10 is where the object 7 is photographed as viewed from the angle of vision $\theta'$ which is caused by the prism $D_4$ to refract and superimpose upon the camera axis x–x′ thereby capturing the image of the object 7 corresponding in center with the focal plane 9. At which time, the angles of vision $\theta$ and $\theta'$ are inverse to the optical axis X–X′ so that the prisms $D_4$ should be symmetric in order to obtain satisfactory results. This may be accomplished by causing the prism $D_4$ to displace with the camera movement. The extent of this displacement varies with the angle of vision $\theta$ or $\theta'$ and increases with increasing angle of full vision $2\theta$.

Such displacement of the prism $D_4$ permits the center $O_1$ of the object 7 photographer over range of $I_1$–$III_1$ to invariably agree with the center $O_2$ of the focal plane 9 irrelative to variations of the angle of vision.

The relation of the camera movement to the prism may be defined by the following formula:

$$\tan \theta = H/L \qquad (1)$$

where the refractory index of the prism is considered $n$, thereby $$\sin i = n \cdot \sin i'$$

where the vertical angle $\beta$ of the prism is considered, thus:

$$\beta = i - \theta$$
$$i' = \beta$$
$$\therefore \beta = \sin^{-1}(n \cdot \sin \beta) - \theta \qquad (2)$$

The vertical angle of the prism will thus be determined by the angle of vision $\theta$, is defined by the distance L and the amount of movement H, and by the refractory index $n$ of the prism. It follows that the camera movement from point $I_1$ to point $III_1$ is to take place in a manner to satisfy the above Formula 2.

Now, the apparatus employed to carry into practice the various modes of stereoscopic photographing operation hereinabove described will be discussed below in connection with FIG. 19.

Figure 9:
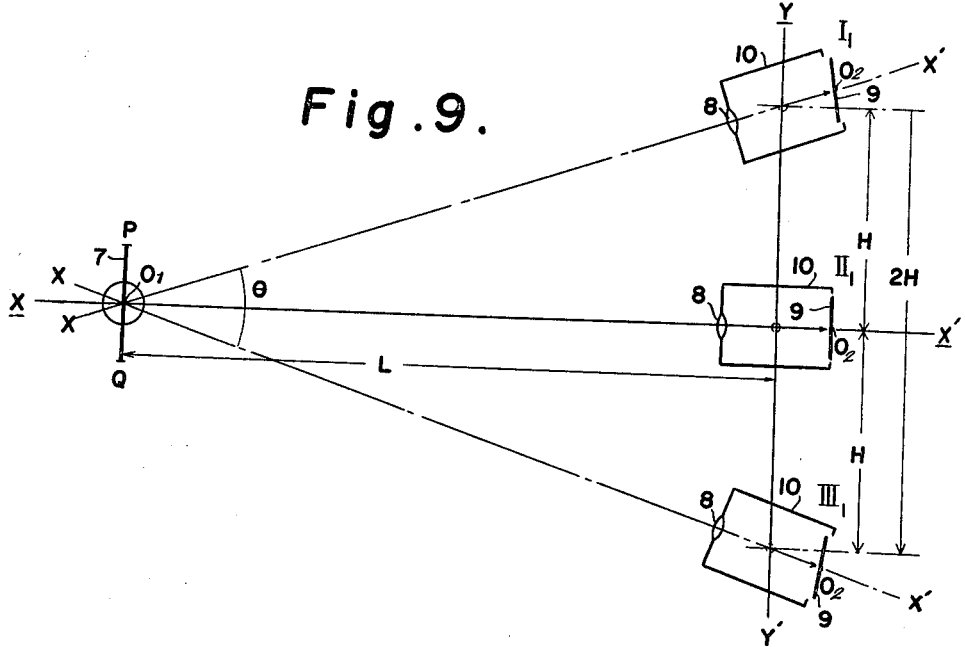
Figure 19:
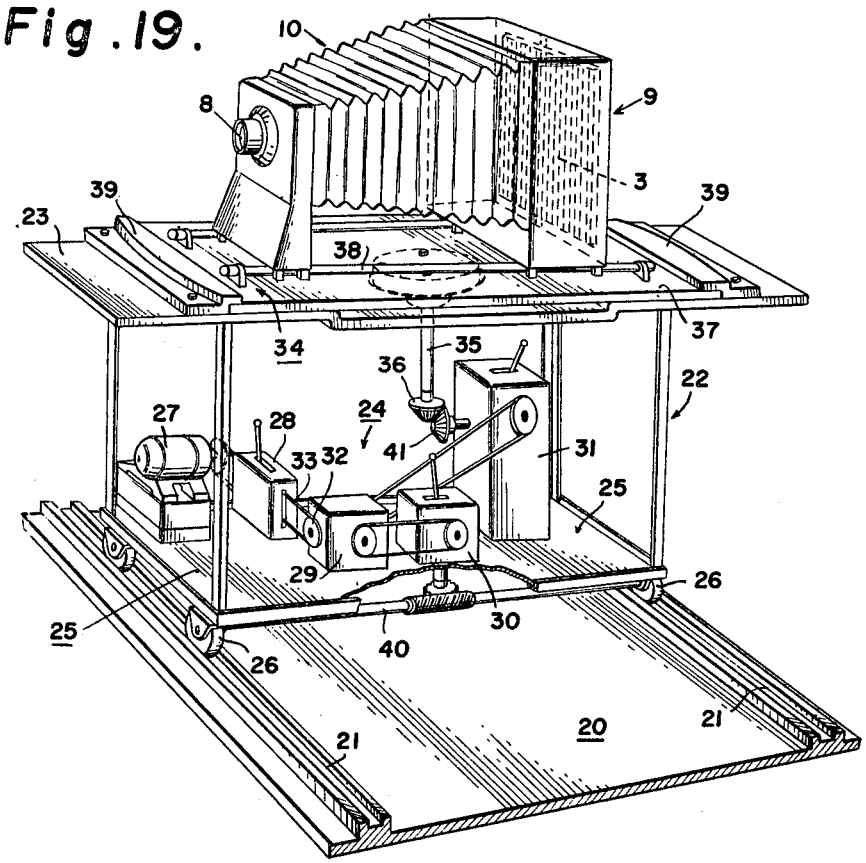

The camera equipment arrangement shown in FIG. 19 is intended to produce stereoscopic photographs according to the process of FIG. 9 in which the camera rotates in synchronism with its parallel movement with respect to an object thereby eliminating the tendency of the object to deviate from the center of the focal plane of the camera.

Designated at 20 is a track base having rails 21 thereon and traversing the optical axis X–X′. The camera 10 is mounted on a cradle 22 which moves along the rails 21 and which is integrally formed with a floor member 25 underneath the bed 23 for mounting the camera, said floor member being adapted to secure each of the drive units 24 thereon. There is provided at each of the four corners of the floor member 25 a roller 26 whereby permitting the equipment cradle 22 to move along the track 20.

The drive unit 24 includes a motor 27, a stepless speed changer 28, a reduction gear 29, a camera reduction gear 30 and a reduction gear 31 for the rotary movement of the camera, all these components being connected by an endless belt 33 driven by the motor 27.

The camera 10 is not fixed to the bed 23 but mounted thereon through a rotating member 34 so as to allow the camera to rotate in synchronism with the parallel movement of the camera as far as necessary to compensate the shift of the image arising from such camera movement.

The rotary member 34 comprises a threaded lever 38 each at one side of a camera seat 37 having a shaft 35 mounted with a gear 36. Both ends of the seat 37 are fitted into guide plates 39 on the bed 23. Similar to a field camera arrangement, the focal plane 9 of the camera having a lenticular screen 1 mounted on the threaded levers 38 is shown in FIG. 6. The camera 10 is mounted centrally on the shaft 35 and movable behind the lens part 8.

With this construction, parallel movements of the camera as well as its rotation are provided by the motor 27. Driving power of the motor 27 is transmitted through the stepless gear 28 and the reduction gear 29 to a stepped speed changer 30, which is adapted to support the rotary shaft 40 upon the cradle 22. The rotary shaft 40 is adapted to rotate the rollers 26 thereby causing the camera 10 to move linearly along the track and parallel to the object.

In the other stepped reduction gear 31, the shaft 35 of the camera seat 37 is driven by the gear 41 meshing with the gear 36 thereby providing rotary movement of the camera 10.

The camera 10 thus makes parallel movements with respect to the object while simultaneously rotating as far as required to compensate for deviations of the successive stereoscopic images which are focused upon the focal plane 9.

Figure 10:
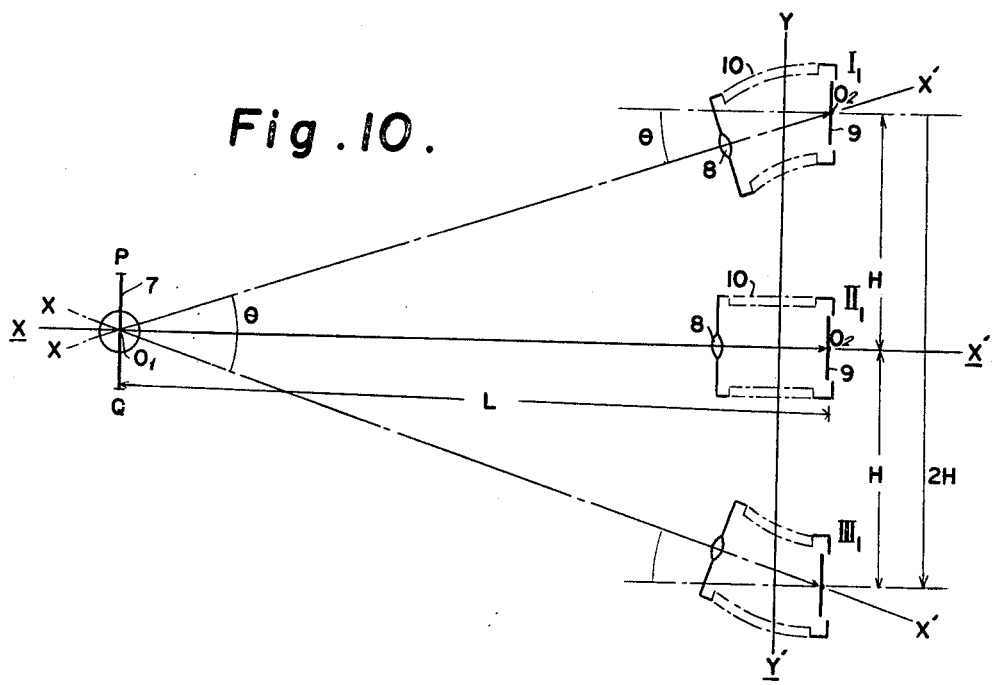
Figure 20:
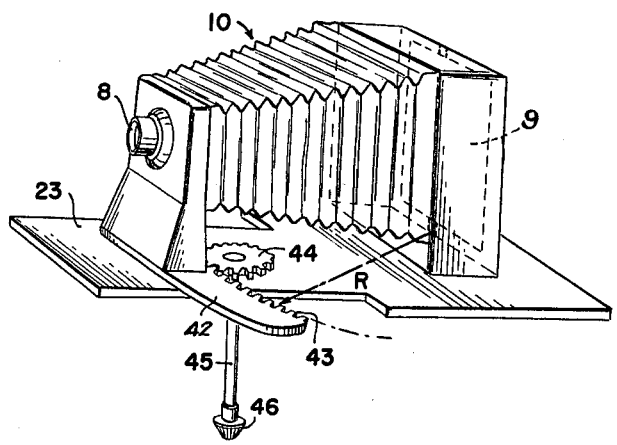
FIG. 20 is a perspective view of a camera equipment arrangement employed to carry the process of FIG. 10 into practice.

FIG. 20 shows an apparatus employed to carry into practice the process revealed in FIG. 10 wherein the lens 8 of the camera 10 is rendered movable. This apparatus 24 to drive the lens 8 is practically the same as described above. There is provided a segment gear 42 having a radius of curvature about the center of the focal plane 9 and underlying the lens 8 of the camera 10. There is also provided a pinion 44 which engages with the rack 43 inside the bed 23. The pinion 44 is secured to the tip end of the rotary shaft 45 carrying the equipment cradle 22 and underneath which is provided a gear 46 adapted to engage the gear 41 of the stepped reduction gear 31.

The camera assembly 10 moves with the cradle 22 along the track 20 and parallel to the object and simultaneously rotates in synchronism with this parallel movement thereby to move the lens 8 for the compensating value, thus bringing into line with the center of the focal plane 9 all image features of the object which may be required to complete a stereoscopic photograph.

Figure 21:
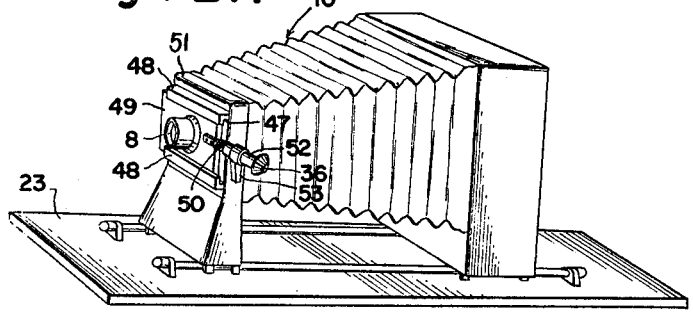
FIG. 21 is a perspective view of a camera equipment arrangement employed to carry the process of FIG. 11 into practice.

FIG. 21 shows an apparatus employed to carry into practice the process of FIG. 11 wherein the necessary compensation for a stereoscopic photograph is accomplished by rendering the camera lens 8 alone movable. The camera 10 is fixed directly on to the bed 23 and has its lens 8 built into a lens seat 49 supported to upper and lower frame members 48 having grooves 47. The lens seat 49 has secured to its front a threaded shaft 50. There is provided at the side of the camera head 51 with a cylinder 52 with arm 53, said cylinder being threaded to engage with the threaded shaft 50 and $h$ having at an end thereof a gear 36. The gear 36 is adapted to rotate the cylinder 52 thereby to extrude the threaded shaft 50 and cause the lens seat 49 to move horizontally along the frames 48 having the grooves 47.

With this construction, the lens of the camera 10 alone is caused to move horizontally to successively scan the nceessary phases of the object to complete a stereoscopic photograph with the center of the object held in focus upon the center of the focal plane 9.

Figure 22:
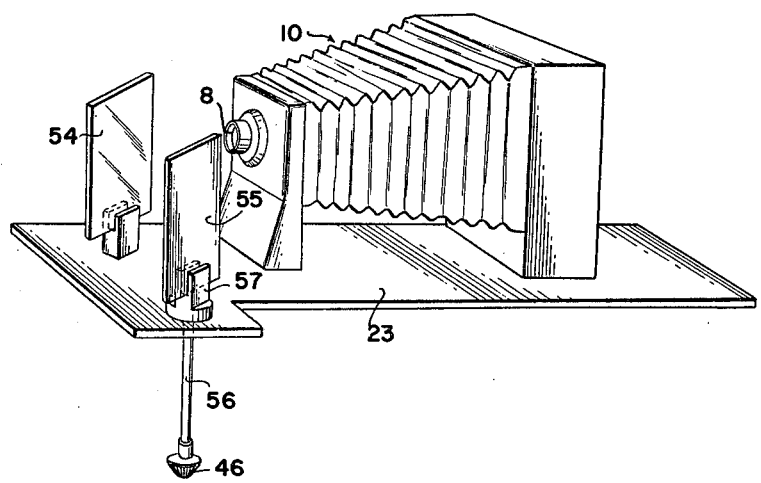
FIG. 22 is a perspective view of a camera equipment arrangement employed to carry the process of FIG. 14 into practice.

FIG. 22 shows an apparatus employed to carry into practice the process of FIG. 14 wherein the necessary compensation is accomplished by means of a rotatable reflecting mirror. The camera 10 is similarly fixed directly onto the bed 23, and there are provided a pair of reflecting mirrors in front of the camera lens 8. The reflecting mirror 54 is secured at 45° in place immediately before the lens 8, while the other mirror 55 is rotatably mounted in a position agreeing upon the optical axis X–X' and in opposition to the first mirror 54.

The reflecting mirror 55 is secured to a rotary panel 57 having a rotary shaft 56 with a gear 46 mounted thereon and is adapted to orient in response to the movement of the rotary panel 57.

The image may be thus reflected by the rotary mirror 55 upon the stationary mirror 54 and further reflected to 45° to focus through the lens 8 onto the focal plane 9.

Figure 23:
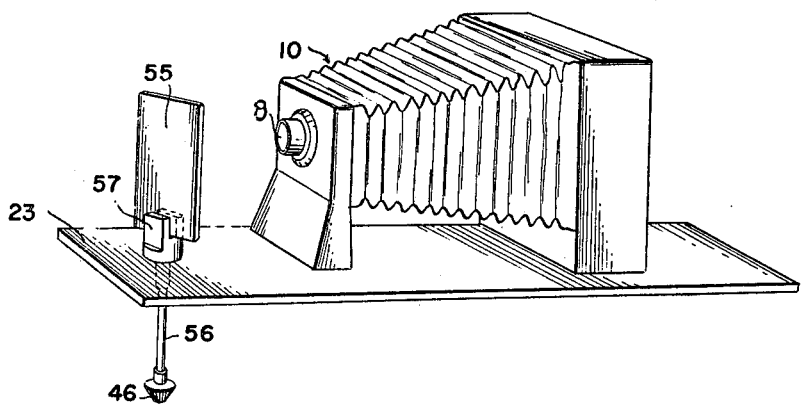
FIG. 23 is a perspective view of a camera equipment arrangement employed to carry the process of FIG. 16 into practice.

FIG. 23 shows an apparatus employed to carry into practice the process of FIG. 16. In this arrangement, the camera 10 is directly secured to the bed 23 of the equipment cradle 22 extending along the track 20. The lens 8 is provided at the front thereof with a single reflecting mirror 55 which is secured at 45° to the rotary panel 57 having its center positioned at the cross-point between the optical axis X–X' and the parallel track Y–Y'. The rotary panel 57 is provided with a rotary shaft 56 having a gear mounted on the lower part thereof.

The reflecting mirror 55 is caused to rotate in synchronism with the movement of the camera 10 on the cradle 22, the rotation of said reflecting mirror being provided by the motor 27 through the reduction gear 30 and the rotary panel 57. The mirror 55 orients successively in its rotary motion to correct the deviation of the center of the object due to the camera movement.

Figure 24:
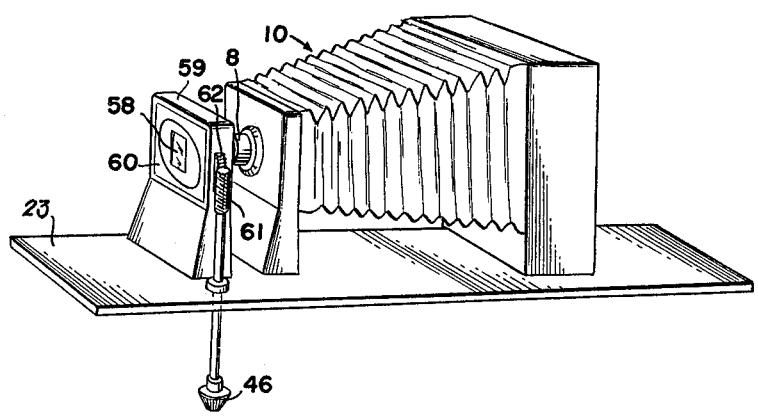
FIG. 24 is a perspective view of a camera equipment arrangement employed to carry the process of FIG. 17 into practice.

FIG. 24 shows an apparatus employed to carry into practice the process of FIG. 17. The camera 10 secured to the bed 23 is provided at the front thereof with a frame 59 adapted to movably support the prism 58. The frame 59 is centrally provided with a circular seat 60 for supporting the prism 58 thereon. There is provided a part 62 adapted to rotate the seat 60 and projecting partially out on the frame 59. The part 62 has connected thereto a threaded shaft 61 having mounted a gear 46 on the lower end thereof.

With this construction, the threaded shaft 61 rotates in synchronism with the camera 10 thereby causing the part 62 to move vertically so that the prism 58 may move with the seat 60 in the manner already described and illustrated in FIG. 17, thus correcting the possible deviation of the center of the object during the scanning movement of the camera.

While the process herein described and the form of apparatus for carrying this process into effect constitute a preferred embodiment of the invention, it is to be understood that the invention is not limited to this precise process and form of apparatus, and that certain changes or modfications may be made without departing from the scope of the invention which is defined in the appended claims.

What is claimed is:

1. A process of making a stereoscopic photograph, comprising moving a camera along a straight linear track for a scanning distance in a direction perpendicular to a reference line between the center of the track and the center of the object and in a direction generally parallel to the object, the track being at a photographing distance from the object, providing a screen at the focal plane of said camera for making a line image from images projected on the screen from different angles relative to the screen, providing a sheet of photosensitive material on the back of said screen, at each of a series of positions of said camera along said track with the optical axis of said camera parallel to said reference line, refracting an image of said object through said lens onto said screen through a rotating prism, and exposing said photosensitive material at each of said positions.

2. A process as claimed in claim 1 in which said rotating prism is provided in front of said lens, and said refracting step comprising rotating said prism at each position of said camera for refracting the image of the object at the proper angle along said optical axis of said camera.

References Cited

UNITED STATES PATENTS 1,882,424    10/1932    Ives.
2,318,983    5/1943    Winnek.

JOHN M. HORAN, Primary Examiner